United States Patent [19]

Haddock et al.

[11] B 3,914,300

[45] Oct. 21, 1975

[54] PHENYL KETOXIME DERIVATIVES

[75] Inventors: Ernest Haddock, Sheppey; William J. Hopwood, Sittingbourne, both of England

[73] Assignee: Shell Oil Company, Houston, Tex.

[22] Filed: Dec. 23, 1971

[21] Appl. No.: 211,786

[44] Published under the Trial Voluntary Protest Program on January 28, 1975 as document no. B 211,786.

[52] U.S. Cl............ 260/553 A; 260/404.5; 260/463; 260/471 C; 260/552 R; 260/553 C; 260/559 B; 260/562 R; 260/562 B; 260/566 A; 260/566 AE; 71/98; 71/99; 71/106; 71/117; 71/118; 71/120; 71/121; 424/301; 424/309; 424/318; 424/322; 424/324; 424/327
[51] Int. Cl.² ........................................ C07C 127/17
[58] Field of Search ................................ 260/553 A

[56] References Cited
UNITED STATES PATENTS

| | | | |
|---|---|---|---|
| 2,709,648 | 5/1955 | Ryker et al. | 260/553 A X |
| 2,768,971 | 10/1956 | Jones | 260/553 A |
| 2,801,911 | 8/1957 | Gilbert et al. | 260/553 A X |
| 3,778,473 | 12/1973 | Kornis et al. | 260/553 A |

OTHER PUBLICATIONS

Doub et al., J. Am. Chem. Soc. Vol. 80, pp. 2205–2217 (1958).
Gheorghiu, Bull. Soc. Chim., Vol. 49, pp. 1205–1210 (1931).

*Primary Examiner*—Leon Zitver
*Assistant Examiner*—Michael W. Glynn

[57] ABSTRACT

Phenyl ketoxime derivatives of the formula

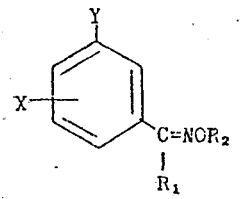

where $R_1$ is alkyl, $R_2$ is hydrogen, alkyl, aralkyl, phenyl substituted by nitro and fluoroalkyl, or acyl, X is hydrogen, halogen, alkoxy, alkylthio, or alkylureido, and Y is amino, ureido, or thioureido optionally substituted by alkyl, phenyl, alkylphenyl or acyl, are useful as herbicides and fungicides.

2 Claims, No Drawings

PHENYL KETOXIME DERIVATIVES

FIELD OF THE INVENTION

This invention relates to novel phenyl ketoxime derivatives having herbicidal and fungicidal properties and to compositions containing them, and to their use as fungicides and herbicides.

SUMMARY OF THE INVENTION

It has now been found that certain novel phenyl ketoxime derivatives are useful as fungicides and herbicides.

DESCRIPTION OF THE PREFERRED EMBODIMENTS

The present invention relates to phenyl ketoxime derivatives of general formula

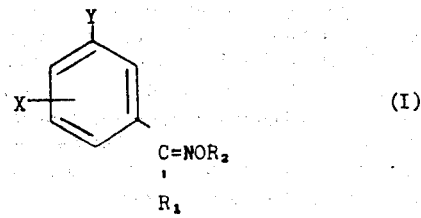

wherein $R_1$ represents an alkyl group, $R_2$ represents a hydrogen atom, an alkyl or aralkyl group, a phenyl group substituted by nitro and by fluoroalkyl, or an acyl group; X represents a hydrogen or halogen atom, or an alkoxy, alkylthio or alkylureido group; and Y represents an amino, ureido or thioureido group optionally substituted by alkyl, phenyl, alkylphenyl or by acyl.

The term "acyl" is used herein in its broadest sense and denotes an organic radical formed by the removal of a hydroxyl group from an organic acid. The term, therefore, includes not only groups derived from carboxylic acids, for example alkanoyl or carbamoyl, but also groups derived from substituted carbonic acids, for example, alkoxycarbonyl or aralkoxycarbonyl.

Preferred phenyl ketoxime derivatives are those wherein $R_1$ represents an alkyl group of 1–6 carbon atoms, for example methyl or propyl; $R_2$ represents a hydrogen atom, an alkyl group of 1–6 carbon atoms, for example methyl, a benzyl group, a phenyl group substituted by one or two nitro groups and by a fluoroalkyl group of 1–6 carbon atoms, for example by trifluoromethyl, an optionally chloro-substituted alkanoyl group of up to 10 carbon atoms, for example acetyl, trichloroacetyl or octanoyl, an alkanoyl group of up to 6 carbon atoms substituted by a phenoxy group bearing chloro or alkyl substituents; for example dichlorophenoxyacetyl, trichlorophenoxyacetyl, or chloromethylphenoxyacetyl, an alkenoyl group of up to 12 carbon atoms, for example undecenyl, a benzyloxycarbonyl group, a chloro-substituted benzoyl group for example trichlorobenzoyl, or a carbamoyl group mono- or di-N-substituted by alkyl of 1–6 carbon atoms, for example by methyl; X represents a hydrogen or chlorine atom, or an alkoxy, alkylthio, or alkylureido group in which the alkyl group is of 1–6 carbon atoms, for example methoxy, methylthio or methylureido; and Y represents an amino group substituted by alkyl of 1–6 carbon atoms, for example by methyl, by alkanoyl of up to 6 carbon atoms optionally bearing a chloro or chloro-phenoxy substituent, for example by acetyl, chloroacetyl, propionyl or by dichlorophenoxyacetyl, by alkoxycarbonyl of up to 6 carbon atoms, for example by ethoxycarbonyl or by isopropoxycarbonyl, or by benzyloxycarbonyl, a ureido group optionally substituted by one or two alkyl groups of 1–6 carbon atoms, for example by methyl or a thioureido group substituted by alkanoyl of up to 6 carbon atoms, for example by acetyl.

The following phenyl ketoxime derivatives are particularly preferred:

3'-(N'-methylureido)acetophenone oxime,
3'-(N',N'-dimethylureido)acetophenone O-methyloxime and
3'-(N'-methylureido)acetophenone O-(4-chloro-2-methylphenoxyacetyl)oxime.

The phenyl ketoxime derivatives of formula I wherein $R_2$ represents a hydrogen atom or an alkyl group, are prepared by reacting a phenyl ketone of general formula:

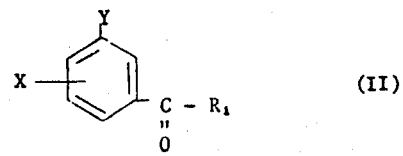

with a hydroxylamine derivative of formula:

$$H_2NOR_2 \quad \quad (III)$$

the hydroxylamine derivative is conveniently used in the form of an acid salt such as the hydrochloride and, in this case, the reaction is suitably carried out in the presence of a base which may, for example, by an alkali metal hydroxide such as sodium hydroxide, an alkali metal salt of a weak organic acid such as sodium acetate, or a tertiary amine such as pyridine. The reaction is preferably carried out in an aqueous alcoholic solvent, for example aqueous ethanol or aqueous isopropanol.

The phenyl ketoxime derivative of formula I wherein $R_2$ represents an aralkyl or acyl group or a phenyl group substituted by nitro and by fluoroalkyl, are prepared by reacting the corresponding compound wherein $R_2$ represents a hydrogen atom with a base, for example an alkali metal hydride such as sodium hydride, or a tertiary amine such as triethylamine or pyridine, and a halo compound of formula:

$$R_2\text{-Hal} \quad \quad (IV)$$

wherein Hal represents a halogen, suitably chlorine, atom. The reaction is preferably carried out in an organic solvent such as ether or benzene.

Those compounds wherein $R_2$ represents a mono-N-alkylsubstituted carbamoyl group may alternatively be obtained by reacting the corresponding compound of formula I wherein $R_2$ represents a hydrogen atom with an alkyl isocyanate, suitably in the presence of a tertiary amine such as triethylamine and in an organic solvent such as methylene chloride.

As mentioned above the phenyl ketoxime derivatives of the invention are useful as herbicides and fungicides and the invention therefore includes pesticidal compositions comprising a carrier or a surface-active agent, or both a carrier and a surface-active agent, together with, as active ingredient, at least one phenyl ketoxime derivative of the invention. Likewise, the invention includes also a method of combatting unwanted plant growth and/or fungi at a locus which comprises applying to the locus a phenyl ketoxime derivative or composition of the invention. The herbicidal activity of the compounds is particularly marked against broad-leaved weeds while fungicidal activity is exhibited particularly against fungal diseases of cereal crops such as wheat.

The term "carrier" as used herein means a solid or fluid material, which may be inorganic or organic and of synthetic or natural origin, with which the active compound is mixed or formulated to facilitate its application to the plant, seed, soil or other object to be treated, or its storage, transport or handling.

Suitable solid carriers are natural and synthetic clays and silicates for example natural silicas such as diatomacious earths; magnesium silicates, for example, talcs; magnesium aluminum silicates, for example, attapulgites and vermiculites; aluminum silicates, for example kaolinites, montmorillonites and micas; calcium carbonates; calcium sulfate; synthetic hydrated silicon oxides and synthetic calcium or aluminum silicates; elements such as for example, carbon and sulfur; natural and synthetic resins such as, for example, coumarone resins, polyvinyl chloride and styrene poymers and co-polymers; solid polychlorophenols; bitumen, waxes such as for example, beeswax, paraffin wax, and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example, kerosene, light mineral oils; chlorinated hydrocarbons, such as for example, carbon tetrachloride, perchloroethylene, trichloroethane, including liquified normally vaporous gaseous compounds. Mixtures of different liquids are often suitable.

The surface active agent may be an emulsifying agent or a dispersing agent or a wetting agent; it may be non-ionic or ionic. Any of the surface-active agents usually applied in formulating herbicides or insecticides may be used. Examples of suitable surface-active agents are the sodium or calcium salts of polyacrylic acids and lignin sulfonic acids; the condensation products of fatty acids or aliphatic amines or amides containing at least 12 carbon atoms in the molecule with ethylene oxide and/or propylene oxide; fatty acid esters of glycerol, sorbitan, sucrose or pentaerythritol; condensates of these with ethylene oxide and/or propylene oxide; condensation products of fatty alcohols or alkyl phenols for example p-octylphenol or p-octylcresol, with ethylene oxide and/or propylene oxide; sulfates or sulfonates of these condensation products, alkali or alkaline earth metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75 percent by weight of toxicant and usually contain in addition to solid carrier, 3–10 percent by weight of a dispersing agent and, where necessary, 0–10 percent by weight of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½ – 10 percent by weight of toxicant. Granules are usually prepared to have a size between 10 and 100 BS mesh (1.676 –0.152 mm), and may be manufactured by agglomeration or impregnation techniques. Generally granules will contain ½ – 25 percent by weight toxicant and 0 – 10 percent by weight of additives such as stabilizers, slow release modifiers and binding agents. Emulsifiable concentrates usually contain, in addition to the solvent and, when necessary, co-solvent, 10–50 percent weight per volume toxicant, 2–20 percent weight per volume emulsifiers and 0–20 percent weight per volume of appropriate additives such as stabilizers, penetrants and corrosion inhibitors. Suspension concentrates are compounded so as to obtain a stable, non-sedimenting, flowable product and usually contain 10 – 75 percent by weight of dispersing agents, 0.1 – 10 percent by weight of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersion and emulsions, for example, compositions obtaining by diluting a wettable powder or a concentrate according to the invention with water, also lie within the scope of the present invention. The said emulsions may be of the water-in-oil or of the oil-in-water type, and may have a thick "mayonnaise"-like consistency.

The compositions of the invention may also contain other ingredients, for example other compounds possessing pesticidal, particularly insecticidal, acaricidal, herbicidal or fungicidal, properties.

In the examples below, the structure of all the products prepared was confirmed by elemental analysis.

EXAMPLE I

3'-Ethoxycarbonylaminoacetophenone oxime

3'-Ethoxycarbonylaminoacetophenone (5.0 grams) was added to a solution of hydroxylamine hydrochloride (3.5 grams) and pyridine (3.8 milliliters) in ethanol (50 milliliters) and the mixture was heated under reflux for 4 hours. The reaction mixture was then evaporated to dryness, water (50 milliliters) was added to the residue and the aqueous mixture was extracted with ethyl acetate (50 milliliters). The organic extract was washed in turn with 2N hydrochloric acid, sodium bicarbonate and water and then dried. The solvent was then removed under reduced pressure and the solid residue recrystallized from ethyl acetate to give the desired product having a melting point of 123°–125°C.

EXAMPLE II

3-Ethoxycarbonylaminophenyl propyl ketoxime

3-Ethoxycarbonylaminophenyl propyl ketone (9.4 grams), sodium acetate (3.3 grams), hydroxylamine hydrochloride (2.8 grams) and water (20 milliliters) in isopropanol (100 milliliters) were heated together under reflux for 3 hours. The mixture was then poured into water and the white precipitate formed was filtered off to give the desired product having a melting point to 142°–143°C.

EXAMPLE III

3'-Propionamidoacetophenone O-methyloxime

3'-Propionamidoacetophenone (4.8 grams) was dissolved in ethanol (50 milliliters) and to this solution was added a solution containing sodium hydroxide (1.0 gram) and methoxyamine hydrochloride (2.3 grams) in water (50 milliliters). The mixture was heated under reflux for 5 hours. The ethyl alcohol was then removed under reduced pressure and the aqueous mixture was extracted with ethyl acetate (twice with 50 milliliters). The organic extracts were dried and evaporated to dryness to yield the desired product having a melting point of 105°–106°C.

EXAMPLE IV

3'-Ethoxycarbonylaminoacetophenone O-(N',N'-dimethylcarbamoyl)oxime

Sodium hydride (0.24 grams as 50 percent dispersion in oil) was added to 3'-ethoxycarbonylaminoacetophenone oxime (1.1 grams) in ether (50 milliliters) and the mixture stirred for 15 minutes. Dimethycarbamoyl chloride (0.5 milliliters) in ether (10 milliliters) was then added to the mixture which was then heated under reflux for one hour. The mixture was poured into water and the ether layer was separated, dried and evaporated to dryness. The residue was recrystallized from a mixture of ether and petroleum ether (boiling point 60°–80°C) to give the desired product having a melting point of 162°–164°C.

EXAMPLE V

3'-Ethoxycarbonylaminoacetophenone O-(N'-methylcarbamoyl)oxime

3'-Ethoxycarbonylaminoacetophenone oxime (4.2 grams), methyl isocyanate (1.4 milliliters) and triethylamine in methylene chloride (40 milliliters) were heated together under reflux for 2 hours. The residue after removal of the solvent was recrystallized from benzene to yield the desired product having a melting point of 101°–103°C.

EXAMPLE VI

3'-(N',N'-Dimethylureido)acetophenone O-(4 chloro-2-methylphenoxyacetyl)oxime

3'-(N',N'-Dimethylureido)acetophenone oxime (1.1 grams prepared by a similar method to that of Example III) and triethylamine (0.5 grams) in acetone (50 milliliters) were cooled to below 5°C. 4-Chloro-2-methylphenoxyacetyl chloride (1.1 grams) in acetone (20 milliliters) was added to the cooled solution over a period of 10 minutes and the mixture was stirred at 20°C for a further 3 hours. Ether (100 milliliters was then added to the reaction mixture which was then filtered. The filtrate was evaporated to dryness and the residue was recrystallized from ether (20 milliliters) to give the desired product having a melting point of 143°–145°C.

EXAMPLE VII

Following procedures similar to those of Examples I–III further compounds were prepared, whose physical characteristics and analyses are set out in Table I.

TABLE I

| Compound | Melting Point, °C |
|---|---|
| 3'-isopropoxycarbonylaminoacetophenone oxime | 121–123 |
| 3'-propionamidoacetophenone oxime | 135–136 |
| 3'-benzyloxycarbonylaminoacetophenone oxime | 170–172 |
| 3'-acetamidoacetophenone oxime | 194–196 |
| 3'-(chloroacetamido)acetophenone oxime | 150–152 |
| 3'-benzyloxycarbonylaminoacetophenone O-methyloxime | 51–53 |
| 3'-(N',N'-dimethylureido)acetophenone oxime | 187–188 |
| 3'-(N',N'-dimethylureido)acetophenone O-methyloxime | 168–170 |
| 3'-(N'-methylureido)acetophenone oxime | 175–177 |
| 3'-(N'-methylureido)acetophenone 0-methyloxime | 134–135 |
| 3'-(N',N'-dimethylureido)acetophenone 0-octanoyloxime | Oil |
| 3'-(N',N'-dimethylureido)acetophenone 0-acetyloxime | 126–129 |
| 3'(N'-methylureido)acetophenone 0-acetyloxime | 135–138 |
| 3'-(N'-methylureido)acetophenone 0-octanoyloxime | 100–102 |
| 3'-ureidoacetophenone oxime | 235–237 |
| 2'-chloro-5'-(N'-methylureido)acetophenone oxime | 142–144 |
| 3'-(N',N'-dimethylureido)acetophenone 0-(benzyloxycarbonyl)oxime | 165–167 |
| 3'-(N'-methylureido)acetophenone 0-(4-chloro-2-methylphenoxyacetyl)oxime | 128–130 |
| 3'-(N'-methylureido)acetophenone 0-benzyloxycarbonyl)oxime | 112–114 |
| 3'-(N'-methylureido)acetophenone 0-(trichloroacetyl)oxime | 151–153 |
| 3'-(N',N'-dimethylureido)acetophenone 0-(2,4-dichlorophenoxyacetyl)oxime | 178–180 |
| 3'-(N',N'-dimethylureido)acetophenone 0-(2,4,5-trichlorophenoxyacetyl)oxime | 181–183 |
| 3'-(N'-methylureido)acetophenone 0-(10-undecenoyl)oxime | 64–66 |
| 3'(N'-acetylthioureido)acetophenone oxime | 169–171 |
| 3'-(N-(2,4-dichlorophenoxyacetyl)amino)acetophenone oxime | 188–190 |
| 3'-(N,N'-dimethylureido)acetophenone oxime | 157–159 |
| 3'-(N-methylamino)acetophenone oxime | Oil |
| 3'(N-(2,4-dichlorophenoxyacetyl)amino)-acetophenone 0-(N'-methylcarbamoyl)oxime | 147–150 |
| 3'(N'-methylureido)acetophenone 0-(N'- | |

TABLE I-continued

| Compound | Melting Point, °C |
| --- | --- |
| methylcarbamoyl)oxime | 165–167 |
| 3'-(N'-methylureido)acetophenone 0-(2,4-dichlorophenoxyacetyl oxime | 160–162 |
| 3'-(N'-methylureido)acetophenone 0-(2,4,5-trichlorophenoxyacetyl)oxime | 191–193 |
| 3'(N'-methylureido)acetophenone 0-(2,4,5-trichlorobenzoyl)oxime | 182–184 |
| 3'-(N'-methylureido)acetophenone 0-(2-nitro-4-trifluoromethylphenyl)oxime | 140–142 |
| 3'-(N'-methylureido)acetophenone 0-benzyloxime | 155–157 |
| 5'-(N'-methylureido-2'-methoxyacetophenone oxime | 203–205 |
| 3'-(N'-phenylureido)acetophenone oxime | 197–199 |
| 3'-(N'-m-tolylureido)acetophenone oxime | 184–186 |
| 3'-(N'-methylureido)acetophenone 0-(2,6-dinitro-4-trifluoromethylphenyl)oxime | 149–151 |
| 3',5'-bis(N'-methylureido)acetophenone oxime (as hemi-hydrate) | 220–222 |
| 2'-methylthio-5'-(N'-methylureido)acetophenone oxime | 167 (dec) |

EXAMPLE VIII

Herbicidal Activity

To evaluate their herbicidal activity, the compounds of the invention were tested using as a representative range of plants; maize, Zea mays (Mz); rice, Oryza sativa (R); barnyard grass, Echinchloa crusgalli (BG); pea, Pisum sativum (P); linseed, Linum usitatissium (L); mustard, Sinapis alba (M); and sugar beet, Beta vulgaris (SB).

The tests fall into two categories, pre-emergence and postemergence. The pre-emergence tests involved spraying a liquid formulation of the compound onto the soil in which the seeds of the plant species mentioned above had recently been sown. The postemergence tests involved two types of test, specifically soil drench and foliar spray tests. In the soil drench tests the soil in which seedling plants of the above species were growing, was drenched with a liquid formulation containing a compound of the invention, and in the foliar spray tests the seedling plants were sprayed with such a formulation.

The soil used in the tests was a steam-sterilized, modified John Innes Compost mixture in which half the peat, by loose bulk, had been replaced by vermiculite.

The formulations used in the tests were prepared by diluting with water and solutions of the compounds in acetone containing 0.4% by weight of an alkylphenol-/ethylene oxide condensate available under the trade name Triton X–155. In the soil spray and foliar spray tests the acetone solutions were diluted with an equal volume of water and the resulting formulations applied at two dosage levels corresponding to 10 and 1 kilograms of active material per hectare respectively in a volume equivalent to 400 liters per hectare. In the soil drench tests, one volume of the acetone solution was diluted to 155 volumes with water and the resulting formulation applied at one dosage level equivalent to 10 kilograms of active material per hectare in a volume equivalent to approximately 3,000 liters per hectare.

In the pre-emergence tests untreated sown soil and in the post-emergence tests untreated soil bearing seedling plants were used as controls.

The herbicidal effects of the compounds were assessed visually seven days after spraying the foliage and drenching the soil and eleven days after spraying the soil, and were recorded on a 0–9 scale. A rating 0 indicates no effect on the treated plants, a rating 2 indicates a reduction in fresh weight of stem and leaf of the plants of approximately 25 percent, a rating 5 indicates a reduction of approximately 55 percent, a rating 9 indicates a reduction of 95 percent, etc.

The results of the tests are set out in Table II.

TABLE II

| Compound | Dosage, kg./ha. | Post-emergence (plants) | | | | | | | | | | | | | | Pre-emergence (seeds) | | | | | | |
| --- | --- | --- | --- | --- | --- | --- | --- | --- | --- | --- | --- | --- | --- | --- | --- | --- | --- | --- | --- | --- | --- | --- |
| | | Soil drench | | | | | | | Foliar spray | | | | | | | Soil spray | | | | | | |
| | | Mz | R | BG | P | L | M | SB | Mz | R | BG | P | L | M | SB | Mz | R | BG | P | L | M | SB |
| 3'-ethoxycarbonylaminoacetophenone oxime | 10 | 1 | 1 | 8 | 0 | 9 | 9 | 9 | 5 | 7 | 9 | 2 | 9 | 9 | 9 | 1 | 5 | 8 | 0 | 8 | 9 | 9 |
| | 1 | | | | | | | | 1 | 0 | 5 | 0 | 9 | 9 | 9 | 0 | 0 | 2 | 0 | 0 | 4 | 4 |
| 3'-isopropoxycarbonylaminoacetophenone oxime | 10 | 0 | 1 | 8 | 0 | 9 | 9 | 9 | 0 | 0 | 7 | 0 | 8 | 9 | 9 | 0 | 4 | 7 | 0 | 0 | 9 | 9 |
| | 1 | | | | | | | | 0 | 0 | 0 | 0 | 3 | 9 | 9 | 0 | 0 | 0 | 0 | 0 | 3 | 0 |
| 3'-propionamidoacetophenone oxime | 10 | 0 | 6 | 7 | 3 | 9 | 9 | 9 | 3 | 8 | 8 | 6 | 9 | 9 | 9 | 0 | 0 | 3 | 0 | 0 | 7 | 7 |
| | 1 | | | | | | | | 1 | 6 | 4 | 1 | 9 | 9 | 9 | 0 | 0 | 0 | 0 | 0 | 0 | 0 |
| 3'-ethoxycarbonylaminophenyl propyl ketoxime | 10 | 0 | 0 | 3 | 0 | 7 | 9 | 9 | 0 | 0 | 6 | 0 | 9 | 9 | 9 | 0 | 0 | 0 | 0 | 0 | 7 | 9 |
| | 1 | | | | | | | | 0 | 0 | 1 | 0 | 9 | 9 | 9 | 0 | 0 | 0 | 0 | 0 | 4 | 0 |
| 3'-benzyloxycarbonylaminoacetophenone oxime | 10 | 0 | 0 | 0 | 0 | 0 | 0 | 0 | 0 | 0 | 0 | 1 | 6 | 9 | 9 | 1 | 2 | 1 | 0 | 0 | 7 | 2 |
| | .1 | | | | | | | | 0 | 0 | 0 | 0 | 3 | 9 | 9 | 0 | 0 | 0 | 0 | 0 | 0 | 0 |
| 3'-acetamidoacetophenone oxime | 10 | 0 | 0 | 2 | 1 | 3 | 1 | 2 | 0 | 1 | 5 | 3 | 9 | 9 | 7 | 0 | 0 | 0 | 0 | 0 | 4 | 0 |
| | 1 | | | | | | | | 0 | 0 | 1 | 1 | 3 | 6 | 3 | 0 | 0 | 0 | 0 | 0 | 0 | 0 |
| 3'-propionamidoacetophenone O-methyloxime | 10 | 1 | 0 | 0 | 2 | 5 | 9 | 7 | 4 | 5 | 4 | 7 | 8 | 9 | 9 | 0 | 0 | 0 | 0 | 3 | 8 | 6 |
| | 1 | | | | | | | | 1 | 1 | 1 | 3 | 5 | 9 | 8 | 0 | 0 | 0 | 0 | 0 | 4 | 0 |
| 3'-(chloroacetamido)acetophenone oxime | 10 | 0 | 0 | 0 | 0 | 0 | 0 | 0 | 0 | 0 | 2 | 2 | 3 | 8 | 8 | 0 | 0 | 0 | 0 | 0 | 0 | 0 |
| | 1 | | | | | | | | 0 | 0 | 0 | 0 | 1 | 2 | 3 | | | | | | | |

TABLE II – Continued

| Compound | Dosage, kg./ha. | Post-emergence (plants) | | | | | | | | | | | | | | Pre-emergence (seeds) | | | | | | |
|---|---|---|---|---|---|---|---|---|---|---|---|---|---|---|---|---|---|---|---|---|---|---|
| | | Soil drench | | | | | | | Foliar spray | | | | | | | Soil spray | | | | | | |
| | | Mz | R | BG | P | L | M | SB | Mz | R | BG | P | L | M | SB | Mz | R | BG | P | L | M | SB |
| 3'-benzyloxycarbonylaminoacetophenone O-methyloxime | 10 | 0 | 0 | 0 | 0 | 0 | 1 | 0 | 1 | 1 | 3 | 2 | 7 | 9 | 9 | 0 | 0 | 2 | 0 | 1 | 8 | 9 |
| | 1 | | | | | | | | 0 | 0 | 0 | 1 | 4 | 8 | 8 | 0 | 0 | 0 | 0 | 0 | 0 | 0 |
| 3'-(N',N'-dimethylureido)acetophenone oxime | 10 | 5 | 8 | 9 | 7 | 9 | 9 | 9 | 5 | 8 | 9 | 3 | 9 | 9 | 9 | 4 | 1 | 9 | 1 | 9 | 9 | 9 |
| | 1 | | | | | | | | 1 | 4 | 4 | 3 | 9 | 9 | 9 | 0 | 0 | 7 | 0 | 0 | 9 | 8 |
| 3'-(N',N'-dimethylureido)acetophenone O-methyloxime | 10 | 3 | 5 | 2 | 6 | 9 | 9 | 9 | 0 | 3 | 3 | 5 | 8 | 9 | 9 | 4 | 1 | 9 | 2 | 8 | 9 | 9 |
| | 1 | | | | | | | | 0 | 1 | 0 | 1 | 5 | 9 | 8 | 0 | 0 | 1 | 0 | 6 | 6 | 5 |
| 3'-(N'-methylureido)acetophenone oxime | 10 | 1 | 3 | 8 | 3 | 9 | 9 | 9 | 4 | 6 | 9 | 6 | 9 | 9 | 9 | 4 | 3 | 9 | 1 | 9 | 9 | 9 |
| | 1 | | | | | | | | 2 | 3 | 9 | 5 | 9 | 9 | 9 | 0 | 0 | 5 | 0 | 3 | 7 | 4 |
| 3'-(N'-methylureido)acetophenone O-methyloxime | 10 | 0 | 5 | 5 | 2 | 7 | 9 | 8 | 0 | 2 | 9 | 3 | 9 | 9 | 9 | 4 | 3 | 8 | 0 | 6 | 9 | 9 |
| | 1 | | | | | | | | 0 | 0 | 7 | 0 | 5 | 9 | 8 | 0 | 0 | 4 | 0 | 0 | 8 | 2 |
| 3'-(N',N'-dimethylureido)acetophenone O-methyloxime | 10 | | | | | | | | | 2 | 9 | | 8 | 9 | | | 1 | 6 | | 6 | 8 | |
| | 1 | | | | | | | | | 0 | 6 | | 7 | 8 | | | 0 | 0 | | 0 | 0 | |
| 3'-(N',N'-dimethylureido)acetophenone O-(4-chloro-2-methylphenoxyacetyl)oxime | 10 | | | | | | | | 7 | 8 | 9 | 7 | 9 | 9 | 9 | 7 | 9 | 9 | 9 | 9 | 9 | 9 |
| | 1 | | | | | | | | 2 | 5 | 8 | 6 | 5 | 9 | 9 | 5 | 8 | 8 | 8 | 8 | 9 | 8 |
| 3'-(N',N'-dimethylureido)acetophenone O-acetyloxime | 10 | 6 | 6 | 9 | 4 | 9 | 9 | 9 | 2 | 8 | 9 | 8 | 9 | 9 | 9 | 6 | 4 | 9 | 4 | 9 | 9 | 9 |
| | 1 | | | | | | | | 0 | 2 | 7 | 1 | 9 | 9 | 9 | 1 | 2 | 7 | 0 | 1 | 9 | 8 |
| 3'-(N'-methylureido)acetophenone O-acetyloxime | 10 | | | | | | | | 8 | 9 | 9 | 7 | 9 | 9 | 9 | 7 | 6 | 9 | 2 | 9 | 9 | 9 |
| | 1 | | | | | | | | 2 | 7 | 7 | 2 | 9 | 9 | 8 | 0 | 0 | 5 | 0 | 0 | 9 | 4 |
| 3'-(N'-methylureido)acetophenone O-octanoyloxime | 10 | 6 | 9 | 9 | 7 | 9 | 9 | 9 | 7 | 9 | 9 | 4 | 9 | 9 | 9 | 5 | 6 | 9 | 0 | 8 | 9 | 9 |
| | 1 | | | | | | | | 0 | 0 | 1 | 0 | 7 | 9 | 8 | 0 | 1 | 0 | 0 | 0 | 7 | 1 |
| 3'-ureidoacetophenone oxime | 10 | 0 | 0 | 3 | 0 | 0 | 0 | 0 | 0 | 0 | 4 | 3 | 6 | 8 | 7 | 0 | 4 | 3 | 0 | 0 | 5 | 4 |
| | 1 | | | | | | | | 0 | 0 | 1 | 0 | 4 | 7 | 1 | 0 | 1 | 0 | 0 | 0 | 0 | 0 |
| 2'-chloro-5'-(N'-methylureido)acetophenone oxime | 10 | 0 | 4 | 6 | 0 | 3 | 7 | 8 | 0 | 2 | 7 | 1 | 7 | 8 | 7 | 1 | 1 | 8 | 0 | 5 | 9 | 9 |
| | 1 | | | | | | | | 0 | 0 | 2 | 1 | 7 | 7 | 6 | 0 | 0 | 2 | 0 | 3 | 2 | 7 |
| 3'-(N',N'-dimethylureido)acetophenone O-(benzyloxycarbonyl)oxime | 10 | 7 | 9 | 9 | 7 | 9 | 9 | 9 | 2 | 7 | 9 | 5 | 9 | 9 | 9 | 5 | 5 | 9 | 0 | 7 | 8 | 9 |
| | 1 | | | | | | | | 1 | 1 | 4 | 2 | 7 | 9 | 9 | 0 | 0 | 3 | 0 | 0 | 3 | 0 |
| 3'-(N'-methylureido)acetophenone O-(4-chloro-2-methylphenoxyacetyl)oxime | 10 | 5 | 5 | 8 | 7 | 9 | 9 | 9 | 6 | 7 | 9 | 8 | 9 | 9 | 9 | 8 | 9 | 9 | 9 | 9 | 9 | 9 |
| | 1 | | | | | | | | 1 | 1 | 7 | 4 | 6 | 8 | 8 | 7 | 9 | 8 | 8 | 9 | 9 | 9 |
| 3'-(N'-methylureido)acetophenone O-(benzyloxycarbonyl)oxime | 10 | 6 | 9 | 9 | 3 | 9 | 9 | 9 | 2 | 6 | 9 | 3 | 9 | 9 | 9 | 2 | 3 | 9 | 0 | 7 | 9 | 9 |
| | 1 | | | | | | | | 0 | 0 | 0 | 0 | 7 | 9 | 3 | 0 | 0 | 0 | 0 | 0 | 2 | 0 |
| 3'-(N'-methylureido)acetophenone O-(2,4-dichlorophenoxyacetyl)oxime | 10 | 4 | 4 | 8 | 7 | 9 | 9 | 9 | 4 | 7 | 9 | 8 | 9 | 9 | 9 | 8 | 9 | 9 | 9 | 9 | 9 | 9 |
| | 1 | | | | | | | | 3 | 6 | 8 | 8 | 9 | 9 | 9 | 6 | 9 | 9 | 9 | 9 | 9 | 9 |
| 3'-(N'-methylureido)acetophenone O-(2,4,5-trichlorophenoxyacetyl)oxime | 10 | 0 | 0 | 0 | 0 | 1 | 0 | 1 | 3 | 7 | 9 | 9 | 9 | 9 | 9 | 5 | 8 | 8 | 7 | 9 | 9 | 9 |
| | 1 | | | | | | | | 1 | 1 | 5 | 7 | 9 | 9 | 8 | 3 | 4 | 3 | 4 | 9 | 7 | 7 |
| 3'-(N'-methylureido)acetophenone O-(2,4,5-trichlorobenzoyl)oxime | 10 | 0 | 0 | 0 | 3 | 1 | 1 | 5 | 5 | 8 | 8 | 8 | 9 | 9 | 9 | 8 | 9 | 9 | 9 | 9 | 9 | 9 |
| | 1 | | | | | | | | 4 | 1 | 4 | 6 | 7 | 8 | 6 | 1 | 8 | 8 | 7 | 8 | 8 | 7 |
| 3'-(N'-methylureido)acetophenone O-(trichloroacetyl)oxime | 10 | 5 | 7 | 9 | 3 | 9 | 9 | 9 | 5 | 7 | 9 | 9 | 9 | 9 | 9 | 8 | 9 | 9 | 7 | 9 | 9 | 9 |
| | 1 | | | | | | | | 0 | 3 | 7 | 4 | 9 | 9 | 9 | 1 | 4 | 6 | 4 | 6 | 7 | 6 |
| 3'-(N',N'-dimethylureido)acetophenone O-(2,4-dichlorophenoxyacetyl)oxime | 10 | 0 | 3 | 0 | 0 | 3 | 8 | 6 | 4 | 6 | 9 | 9 | 9 | 9 | 9 | 6 | 9 | 9 | 9 | 9 | 9 | 9 |
| | 1 | | | | | | | | 3 | 0 | 5 | 8 | 7 | 9 | 9 | 5 | 8 | 8 | 8 | 9 | 9 | 9 |
| 3'-(N',N'-dimethylureido)acetophenone O-(2,4,5-trichlorophenoxyacetyl)oxime | 10 | 0 | 0 | 0 | 0 | 0 | 0 | 5 | 5 | 4 | 7 | 9 | 9 | 9 | 9 | 4 | 8 | 8 | 0 | 9 | 9 | 9 |
| | 1 | | | | | | | | 3 | 0 | 2 | 8 | 9 | 9 | 7 | 1 | 1 | 2 | 0 | 6 | 4 | 5 |
| 3'-(N'-methylureido)acetophenone O-(10-undecenoyl)oxime | 10 | 5 | 8 | 9 | 4 | 9 | 9 | 9 | 6 | 6 | 9 | 5 | 9 | 9 | 9 | 5 | 7 | 9 | 0 | 8 | 9 | 9 |
| | 1 | | | | | | | | 3 | 0 | 2 | 1 | 6 | 7 | 5 | 2 | 3 | 3 | 0 | 0 | 6 | 0 |

EXAMPLE IX

Fungicidal Activity

Direct Activity

Intact leaves or leaf pieces of wheat and cucumber were supported on water-saturated seed germination pads in 9 cm petri dishes and were sprayed with aqueous suspensions containing 1000 ppm of the test compound. The leaves or leaf pieces were allowed to dry and were then innoculated with spores of *Puccina recondita* (brown wheat rust) and *Erysiphe cichoracearum* (cucumber powdery mildew) respectively. Observations on the development of disease symptoms were made after 2–7 days.

Systemic Activity

Table 3

| | FUNGICIDAL ACTIVITY | | |
| --- | --- | --- | --- |
| | DIRECT ACTIVITY | | SYSTEMIC ACTIVITY |
| | P. recondita | E. cichoracearum | P. recondita |
| 3'-isopropoxycarbonylaminoacetophenone oxime | 1 | 2 | — |
| 3'-propionamidoacetophenone oxime | 1 | 2 | — |
| 3'-(N',N'-dimethylureido)acetophenone oxime | 2 | 2 | 2 |
| 3'-(N',N'-dimethylureido)acetophenone 0-methyloxime | — | — | 2 |
| 3'-(N'-methylureido)acetophenone oxime | 2 | 2 | 2 |
| 3'-(N',N'-dimethylureido)acetophenone 0-(4-chloro-2-methylphenoxyacetyl)oxime | 2 | 2 | — |
| 3'-(N',N'-dimethylureido)acetophenone 0-acetyloxime | 2 | 2 | 2 |
| 3'-(N'-methylureido)acetophenone 0-acetyloxime | 2 | 2 | 2 |
| 3'-(N'-methylureido)acetophenone 0-octanoyloxime | 2 | 2 | 2 |

A quantity of 12 milligrams of the finely ground test compound was applied to the surface of each of three soil samples contained in separate 2 × 2 inch plastic pots. The soil samples were then sown each with 12 wheat seeds which were covered with soil and allowed to grow for 10 days. The resulting plants were then innoculated with spores of *Puccina recondita* (brown rust) and observations on the development of the fungus were made after 7 days.

The results of the tests are set out in Table III, in which a result 2 indicates more than 80 percent control of the fungal disease, a result 1 indicates 50–80 percent control and a result 0 indicates less than 50 percent control.

We claim as our invention:
1. 3'-(N'-methylureido) acetophenone oxime.
2. 3'-(N',N'-dimethylureido) acetophenone O-methyloxime.

* * * * *